United States Patent [19]

Inuiya

[11] 4,383,274
[45] May 10, 1983

[54] AUTOMATIC FOCUS CONTROLLING DEVICE

[75] Inventor: Masafumi Inuiya, Asaka, Japan

[73] Assignee: Fuji Photo Film Co., Ltd., Kanagawa, Japan

[21] Appl. No.: 244,917

[22] Filed: Mar. 18, 1981

[30] Foreign Application Priority Data

Mar. 19, 1980 [JP] Japan .................................. 55-35200

[51] Int. Cl.³ ............................................. H04N 3/26
[52] U.S. Cl. .................................... 358/227; 352/140; 354/195; 355/56
[58] Field of Search ................ 358/227, 205, 125, 126; 352/39, 140; 354/25, 289, 195, 199, 196, 200; 355/55, 56; 455/30 T

[56] References Cited

U.S. PATENT DOCUMENTS

| | | | |
|---|---|---|---|
| 3,211,831 | 10/1965 | Steiner | 358/227 |
| 3,538,334 | 11/1970 | Shaffer, Jr. | 358/227 |
| 4,101,837 | 7/1978 | Clayton, Jr. | 455/307 |
| 4,300,826 | 11/1981 | Aoki et al. | 354/198 |
| 4,320,417 | 3/1982 | Hamma | 358/227 |

FOREIGN PATENT DOCUMENTS

| | | | |
|---|---|---|---|
| 2241297 | 8/1972 | Fed. Rep. of Germany | 358/227 |
| 52-3331 | 1/1977 | Japan | 358/227 |

Primary Examiner—Tommy P. Chin
Attorney, Agent, or Firm—Pasquale A. Razzano

[57] ABSTRACT

In an automatic focus controlling device, a bilinear type CCD is driven in synchronization with pixell clock pulses having a predetermined frequency to generate time series electric signals corresponding to brightness of an image formed thereon. The time series electric signals are caused to pass through a low-pass filter and a band-stop filter. The low-pass filter cuts off signal components having a frequency higher than the predetermined frequency of the pixell clock pulses, and the band-stop filter cuts off components of the signals having a frequency near the half of the frequency of the pixell clock pulses. Contrast signals free from noises are obtained by differentiating the signals having passed through the filters, and focus is controlled based on the contrast signals.

1 Claim, 6 Drawing Figures

AUTOMATIC FOCUS CONTROLLING DEVICE

BACKGROUND OF THE INVENTION

1. Field of the Invention

This invention relates to an automatic focus controlling device utilizing a linear solid state image pick-up device.

2. Description of the Prior Art

An automatic focus controlling device for an image reading system or a TV camera utilizing a linear solid state image pick-up device generally comprises a linear solid state image pick-up device, a taking lens for forming an image of an object on an image pick-up face of the solid state image pick-up device, a servomechanism for moving the taking lens along the optical axis thereof, a driver means which generates pixell (picture cell) clock pulses with a predetermined frequency and drives the solid state image pick-up device in synchronization with the pixell clock pulses, a differentiating means for generating contrast signals (which has its maximum level when the image is most sharply focused by differentiating time series electric signals from the solid state image pick-up device made by reading the image of the object on the image pick-up face thereof, a comparator which compares the level of two peaks of the contrast signals with each other at two different positions of the taking lens when moved along the optical axis thereof by the servomechanism, and a control circuit for controlling the servomechanism according to a difference signal generated by the comparator based on the difference between the levels of the two peaks.

Said linear solid state image pick-up device is also called a linear image sensor and is defined as an image pick-up device comprising a photoelectric element of self-scanning type such as CCD (charge coupled device) or a photodiode array. For example, in an image reading system a solid state image pick-up device or a CCD of bilinear type is employed as the linear solid state image pick-up device in order to obtain a doubled resolution power.

The bilinear type CCD is formed of two sets of photosensitive elements having different integration zones and arranged in the inter-digital form.

However, the bilinear type CCD is disadvantageous in that spike noises are apt to appear in time series electric signals generated thereby and that difference in intensity is apt to be observed between odd numbered signal and even numbered signal of the time series electric signals due to the difference in the characteristics of the two sets of photosensitive elements. These disadvantages will adversely affect upon the comparator when detecting the peaks of the contrast signal. Thus, there is a possibility of miscontrol of focus.

SUMMARY OF THE INVENTION

In light of the foregoing observation and description, the primary object of the present invention is to provide an automatic focus controlling device utilizing a bilinear type solid state image pick-up device free from disadvantages mentioned hereinabove.

The above object of the present invention can be accomplished by inserting a low pass filter and a band-stop filter between the bilinear type solid state image pick-up device and the differentiating means to cut off signal components having a frequency higher than the predetermined frequency of the pixell clock pulses from the time series electric signals, and to cut off signal components having a frequency near the half of the frequency of the pixell clock pulses from the time series electric signals.

Accordingly to the present invention, the maximum value of the contrast signal can be accurately detected and the focus can be accurately controlled, since the noises and the deviation in the time series electric signals generated by the bilinear type solid state image pick-up device are eliminated therefrom.

DESCRIPTION OF THE PREFERRED EMBODIMENT

Figure 1:
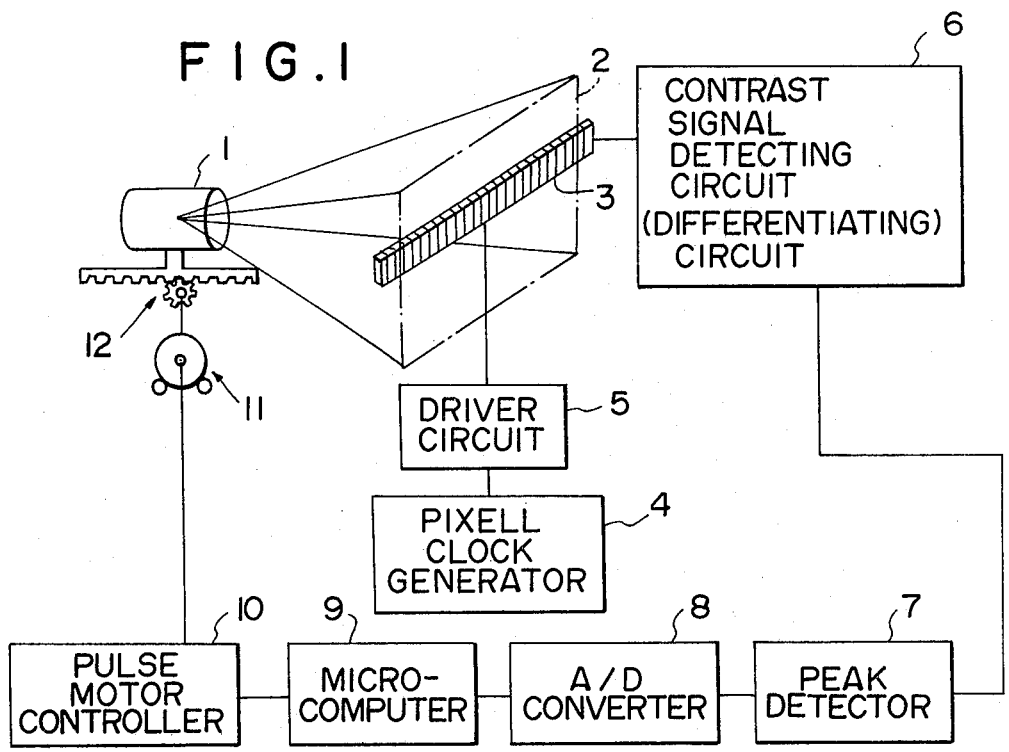
FIG. 1 schematically shows an automatic focus controlling device in accordance with an embodiment of the present invention, FIGs. 2A, 2B and 2C respectively show time series electric signals in different stages of the signal processing in the automatic focus controlling device of FIG. 1.

Referring to FIG. 1 showing an automatic focus controlling device in accordance with an embodiment of the present invention, an image 2 of an object (not shown) is formed on a bilinear type solid state image pick-up device 3, e.g. a CCD, by means of a taking lens 1. The image pick-up device 3 is driven by a driver circuit 5 in synchronization with pixell clock pulses generated by a pixell clock generator 4 to effect scanning, and reads the image 2 to generate a time series electric signal corresponding to the image 2. The time series electric signal is inputed to a contrast signal detecting circuit 6 and is used to automatically control focus. If desired, an output terminal for image reading may be provided. The contrast signal detecting circuit 6 comprises a differentiating means as will be described in more detail hereinafter and takes a contrast signal out of the time series electric signal (image signal), the level of the contrast signal going up and down depending upon sharpness of the time series electric signal. The sharpness of the time series electric signal depends upon whether or not the image 2 on the image pick-up device 3 is sharply focuses or not. More specifically, the contrast signal detecting circuit 6 outputs a contrast signal corresponding to each picture cell of the image pick-up device 3. The contrast signal is inputed into a peak detector 7. The peak detector 7 detects and holds the contrast signal which exhibits the maximum level or the peak in one scan of the image pick-up device 3. The level of the peak of the contrast signal is converted into a digital value by means of an A/D converter 8 and transmitted to a microcomputer 9 through an input/output interface (not shown). The microcomputer 9 compares the level of the peak in one scan of the image pick-up device 3 with the same in the next scan thereof and provides a pulse motor control signal for moving the taking lens 1 toward a position in which the level of the peak reaches the maximum level. The pulse motor control signal is inputed into a pulse motor controller 10 through said input/output interface. The pulse motor controller 10 rotates a pulse motor (servomechanism)

11 in one direction or the other to such a degree that depends on the number of the pulses given thereto. When the pulse motor 11 is rotated, the taking lens 1 is moved along its optical axis, for example, by way of a rack and pinion mechanism 12 whereby the focus is automatically controlled.

As described hereinabove, when using a bilinear type CCD as the image pick-up device 3, spikes appear in the time series electric signal generated thereby, and the difference between the characteristics of the two sets of the elements causes difference in intensity between the signals in the odd numbered elements and the signals in the even numbered elements. Hereinafter, the spike and the difference are called simply as "noise". When such a noise appear in the time series electric signal, the time series electric signal would become as shown in FIG. 2A even if the image read by the image pick-up device 3 has no contrast, and accordingly, the level of the peak of the contrast signal cannot be accurately detected.

Figure 3:
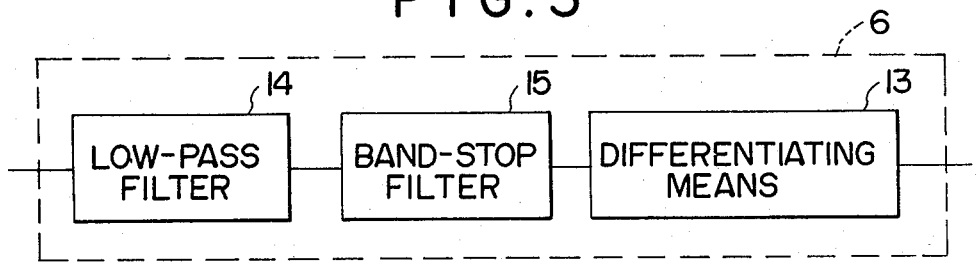
FIG. 3 is a block diagram illustrating in detail a contrast signal detecting circuit employed in the automatic focus controlling device of FIG. 1.

In accordance with the present invention, such noises can be eliminated by providing a low-pass filter 14 (See FIG. 3) and a band-stop filter (or notch filter) 15 before a differentiating means 13 in the contrast signal detecting circuit 6.

Figure 4:
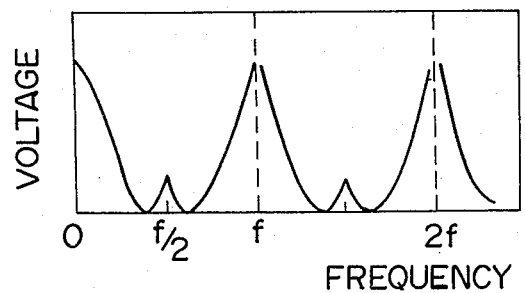
FIG. 4 shows by way of example the frequency characteristics of time series electric signals generated by a bilinear type solid state image pick-up device by reading an image of an object having no contrast.
Figure 2A:
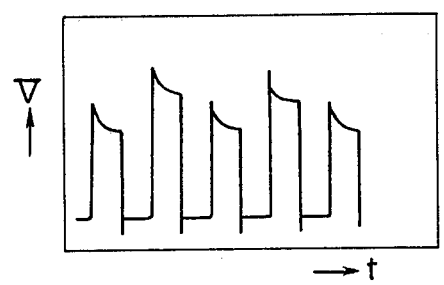
Figure 2B:
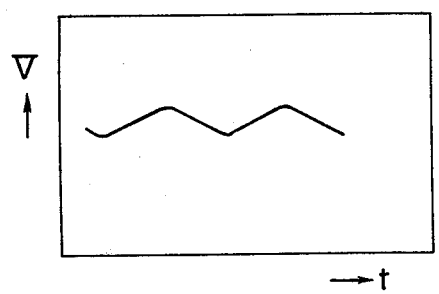
Figure 2C:
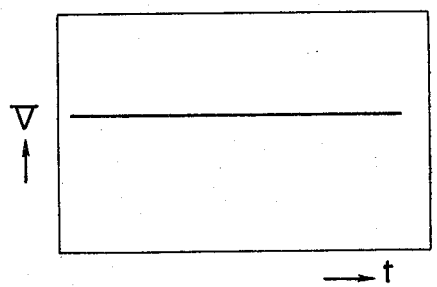

The frequency characteristics of the time series electric signal shown in FIG. 2A is as shown in FIG. 4. Accordingly, when a low-pass filter which cuts off signal components having a frequency higher than the frequency f of the pixell clock pulses is used as the low-pass filter 14, the time series electric signal shown in FIG. 2A is converted into a signal free from spikes as shown in FIG. 2B after passing through the low-pass filter 14. The signal shown in FIG. 2B has a frequency equal to a half of the frequency of the pixell clock pulses. This is due to the fact that the bilinear type CCD is constituted by two sets of photosensitive elements having different characteristics. Accordingly, a band-stop filter which cuts off components having a frequency near the half of the frequency of the pixell clock pulses is used as the band-stop filter 15 in order to eliminate the oscillation. The electric signals shown in FIG. 2B is thus converted into a signal free from the oscillation as shown in FIG. 2C after passing through the band-stop filter 15. A contrast signal free from the above described noises can obtained by differentiating the signal having passed through the filters 14 and 15 by the differentiating means 13.

In the above example, the level of the electric signal having passed through the band-stop filter 15 is constant or flat since the image has no contrast. However, in case of an image having contrast, the signal having passed through the band-stop filter 15 will oscillates according to the contrast of the image.

Instead of using a low-pass filter and a band-stop filter, a single low-pass filter which cuts off components having a frequency higher than f/2 may be used.

As can be seen from the above description, in accordance with the present invention, contrast signals free from noise can be obtained. Thus, focus can be controlled with high accuracy. Further, the automatic focus control of the present invention is simple in its mechanism.

I claim:

1. An automatic focus controlling device comprising a bilinear type solid state image pick-up device, a taking lens for forming an image of an object on an image pick-up face of the image pick-up device, a servomechanism for moving the taking lens along the optical axis thereof, a driver means which generates pixell clock pulses with a predetermined frequency and drives said image pick-up device in synchronization with the pixell clock pulses, a differentiating means for generating a contrast signal by differentiating a time series electric signal from said image pick-up device made by reading the image of the object, detecting means for detecting peak levels of said contrast signal, a comparator which compares the levels of two peaks of the contrast signal with each other at two different positions of said taking lens when moved along its optical axis by said servomechanism, and a control circuit for controlling the servomechanism according to a difference signal generated by the comparator based on the difference between the levels of the two peaks wherein the improvement which comprises a low-pass filter and a band-stop filter inserted between said bilinear type solid state image pick-up device and said differentiating means, both the filters serving to cut off signal components having a frequency higher than said predetermined frequency and signal components having a frequency near the half of the predetermined frequency, respectively, from the time series electric signal.

* * * * *